United States Patent [19]

Gielen et al.

[11] Patent Number: 5,177,396
[45] Date of Patent: Jan. 5, 1993

[54] MIRROR WITH DICHROIC COATING LAMP HOUSING

[75] Inventors: Joseph G. M. G. Gielen, Sint-Truiden; Louis L. J. M. Hoeben, Hasselt, both of Belgium; Charles E. Mellor, Peabody, Mass.

[73] Assignees: GTE Products Corporation, Danvers, Mass.; GTE Sylvania N.V., Tienen, Belgium

[21] Appl. No.: 630,148

[22] Filed: Dec. 19, 1990

[51] Int. Cl.⁵ .............. H01J 03/16; H01J 61/18; H01J 61/38; H01K 01/32
[52] U.S. Cl. .................. 313/113; 313/25; 313/112; 313/579; 313/580; 313/635; 313/638; 362/293; 362/296; 359/360; 359/585; 359/586; 359/588, 359/589; 359/839; 359/884
[58] Field of Search .......... 313/113, 112, 25, 579, 313/580, 635, 638; 312/341, 296, 293, 310, 311; 359/360, 589, 359, 584, 585, 586, 588, 838, 839, 884

[56] References Cited

U.S. PATENT DOCUMENTS

| | | | |
|---|---|---|---|
| 3,174,067 | 3/1965 | Bahrs | 313/112 X |
| 3,188,513 | 6/1965 | Hansler | 359/359 X |
| 3,944,320 | 3/1976 | McLintic | 350/166 X |
| 4,663,557 | 5/1987 | Martin, Jr. et al. | 313/112 |
| 4,829,210 | 5/1989 | Benson et al. | 313/113 X |
| 4,838,629 | 6/1989 | Maruyama et al. | 359/359 |
| 4,839,553 | 6/1989 | Mellor | 313/112 X |
| 4,854,670 | 8/1989 | Mellor | 359/359 |

Primary Examiner—Donald J. Yusko
Assistant Examiner—Ashok Patel
Attorney, Agent, or Firm—Robert E. Walter

[57] ABSTRACT

A light mirror and a lamp including a light mirror are disclosed. The light mirror includes a light pervious substrate having a reflecting surface, a metal coating disposed in the reflecting surface, and a dichroic coating disposed on the metal coating. The dichroic coating is designed to reflect essentially all of the visible light spectrum and to transmit infra-red radiation and any unreflected portion of the visible light spectrum. A method for controlling the heat transmission of a cold light mirror is also disclosed.

17 Claims, 7 Drawing Sheets

MIRROR WITH DICHROIC COATING LAMP HOUSING

TECHNICAL FIELD OF THE INVENTION

This invention relates to a substrate including a dichroic coating, and more particularly to a substrate including a dichroic coating useful in lighting applications.

BACKGROUND OF THE INVENTION

Lamps and optical systems for a variety of lighting applications, such as medical, theatrical, educational, merchandising lighting, include a cold light mirror. A cold light mirror transmits the infrared portion of the light striking the cold light mirror surface and reflects all or selected portions of the visible wavelength bands striking the reflector surface. By transmitting the infrared (i.e., heat) portion of the light through the cold light mirror surface, the light beam projected from a light source/cold light mirror combination is cooler than a light beam projected from a light source/metal mirror combination.

A cold light mirror which reflects substantially all of the visible light is often referred to as a neutral cold light mirror. A cold light mirror which reflects only a portion of the visible light is often referred to as a color-correcting cold light mirror. However, both are cold light mirrors.

Neutral and color-correcting cold light mirrors typically used in lamps and optical systems are described extensively in the technical literature. Such cold light mirrors usually include a transparent form or substrate, one surface of which is coated with a dichroic coating consisting of a series of thin film layers of alternating high and low refractive index materials (compared to the substrate). The optical thickness of each layer is generally one-quarter ($\frac{1}{4}$) of the wavelength of the radiation for which high reflectance is desired.

In lighting applications utilizing high wattage lamps, heat transmission through a cold light mirror into the lamp fixture or housing can be detrimental to the lamp fixture or housing. Such heat transmission is especially a problem for closed fixtures in which the temperature may rise above the maximum allowable service temperature for the fixture or housing. Such raised temperature may result in degeneration of the wire insulation and/or arts of the fixture fabricated from heat sensitive materials, such as plastic.

U.S. Pat. No. 3,944,320 of McLintic is concerned with thermal expansion and cooling problems associated with use of cold light mirrors on transparent substrates in light beam projection applications. McLintic describes a cold light mirror having a metal substrate, a pigmented vitreous coating on the substrate which coating is capable of absorbing infra-red radiation and having a smooth glazed surface, and a dielectric interference coating on the surface of the vitreous coating. McLintic emphasizes that, in manufacturing the cold light mirror of his invention, care has to be taken to ensure that the glaze of the pigmented vitreous coating is specular in order that the optical properties of the complete structure are unimpaired. Such special care is required because the layers of the interference coating are too thin to be able to remove surface irregularities which may exist on the surface upon which they are laid. Further, the absorption of heat by the reflector does not overcome problems caused to the fixture or housing by heating of the fixture or housing.

It would represent an advance in the art to obtain a light mirror which reduces the heat absorbed by or transmitted through the coated reflector.

SUMMARY OF THE INVENTION

In accordance with the present invention, there is provided a light mirror comprising a light pervious substrate having a reflecting surface, a metal coating disposed on the reflecting surface of the substrate, and a dichroic coating disposed on the metal coating.

In accordance with another aspect of the present invention, there is provided a lamp comprising: a light mirror comprising a light pervious reflector-shaped substrate partially enclosing an interior and having a reflecting surface, a metal coating disposed on the reflecting surface of the reflector, and a dichroic coating disposed on the metal coating; and a light source capsule mounted within the interior of the reflector.

In accordance with yet another aspect of the invention, there is provided a method for controlling the heat transmission of the cold light mirror. The method comprises applying a metal coating to a surface of a light pervious substrate, the thickness of the coating being selected such that the metal coating will reflect at least a portion of infra-red radiation transmitted through a superposed dichroic coating, and applying the dichroic coating on the surface of the metal coating.

Figure 1:
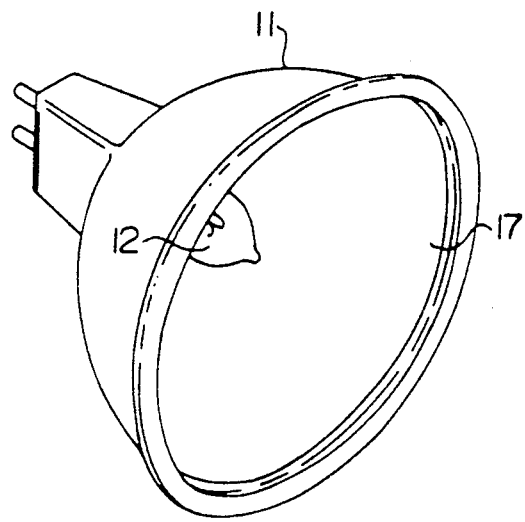
FIG. 1 is a perspective view of an example of a lamp of the invention.

For a better understanding of the present invention, together with other and further advantages and capabilities thereof, reference is made to the following disclosure and appended claims in conjunction with the above-described drawings.

DETAILED DESCRIPTION OF THE INVENTION

The light mirror of the invention comprises a light pervious substrate having a reflecting surface, a metal coating disposed on the reflecting surface of the substrate, and a dichroic coating disposed on the metal coating.

As will be demonstrated by Examples and test results that follow, the light mirror of the invention reduces the heat absorbed by or transmitted through the coated reflector, thereby minimizing or eliminating the problem often experienced by use of cold mirrors in closed fixtures wherein the temperature may rise above the maximum allowable service temperature, causing degeneration of some insulation and plastic parts of the fixture.

The dichroic coating can be designed to reflect virtually all or selected portions of visible light and to transmit all or some infra-red radiation and any unreflected portions of the visible light.

When, however, the present invention is utilized in conjunction with a dichroic coating designed to reflect only selected portions of visible light, thus transmitting the unselected portions of visible light through the dichroic coating, the visible light reflection from the metal layer will disturb the reflection of the dichroic coating, adversely affecting the color temperature of light reflected by the light mirror. In applications where color temperature is not a consideration, this will not be a problem.

The light pervious substrate can be transparent, for example, glass, or translucent, for example, polycrystalline alumina. In many lighting applications, however, a transparent glass substrate is particularly desirable. The type of glass, i.e., whether hard or soft, used to form the substrate may be determined by the environment in which the light mirror will ultimately be used. A hard (e.g., pyrex) glass substrate is preferred based on its durability and cost.

In the light mirror of the invention, the metal coating disposed on the substrate reflects at least a portion of the infrared radiation transmitted through the dichroic coating thereby reducing the heat (i.e., infra-red radiation) absorbed by or transmitted through the back of the light mirror as compared to a typical cold light mirror not including the metal layer between the substrate and the dichroic coating.

The light mirror of the invention preferably meets the following optical specification:
a) less than 0.5% transmission between 430 and 700 nm
b) an average reflection between 800 and 2500 nm of at least about 80%.

The metal coating preferably comprises a metal having a high reflection coefficient (R), i.e., R is greater than or equal to 0.8. Examples of metals suitable for use in the metal coating of the invention are silver, gold, aluminum, and rhodium. For economical reasons, aluminum is particularly useful.

The dichroic coating comprises alternating layers of high and low refractive index materials. Examples of such low refractive index materials include, for example, Kryolith, $MgF_2$ or $SiO_2$. Examples of high refractive index materials include, for example, ZnS or $TiO_2$. Other high and low refractive index materials which are useful in forming cold mirror dichroic coating are well known to those skilled in the art and can be used here.

The coatings on the substrate of the light mirror of the invention preferably meet the following adhesion criteria:
a) the coating does not peel off after 10 minutes in boiling water; and
b) the coating is not removed by pressing a piece of adhesive tape against the coated surface and removing it with a snap.

The light mirror of the invention can be a part of a lighting fixture or, alternatively, can be an integral component of a lamp.

A particularly useful shape for the light pervious substrate for general lighting applications is a reflector shape, and more particularly, a parabolic or elliptical shaped reflector. The substrate, however, may be of any shape, and the reflecting surface of the reflector may be smooth, stippled, or faceted.

Further, a lamp including the light mirror of the invention as a component thereof may be open (with no lens) or closed (with a lens).

Figure 2:
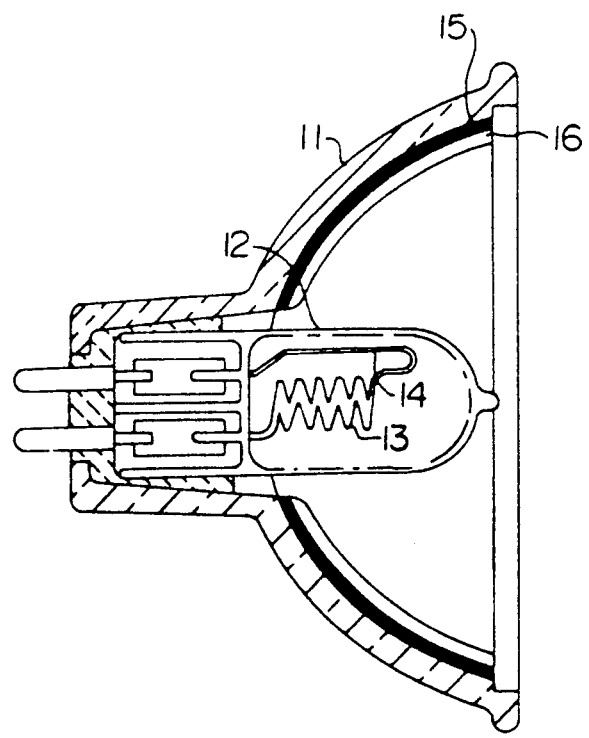
FIG. 2 is a cross-sectional view of the lamp of FIG. 1.

On example of a lamp embodying the light mirror of the invention is shown in FIGS. 1 and 2. FIG. 1 is a perspective view of a lamp including a reflector shaped light mirror of the invention as a component thereof. The lamp comprises a glass elliptical type reflector 11 and has a light source 12 mounted therein. The metal coating/dichroic coating structure 17 is disposed on the reflecting surface of the reflector-shaped substrate.

FIG. 2 is a cross-sectional view of the lamp shown in FIG. 1. The metal coating 15 is disposed on the reflecting surface of the reflector 11, and the dichroic coating 16 is superposed on the metal coating 15. The light source 12 is mounted within the reflector 11. The particular light source shown is an incandescent type lamp, which contains a filament 13 and filament support 14.

Although an incandescent type lamp is shown in the drawings, the light source mounted within the reflector may alternatively be a tungsten halogen light source or an arc discharge light source, such as a metal halide light source capsule. Such light sources are well known to those in the lighting art.

Figure 3:
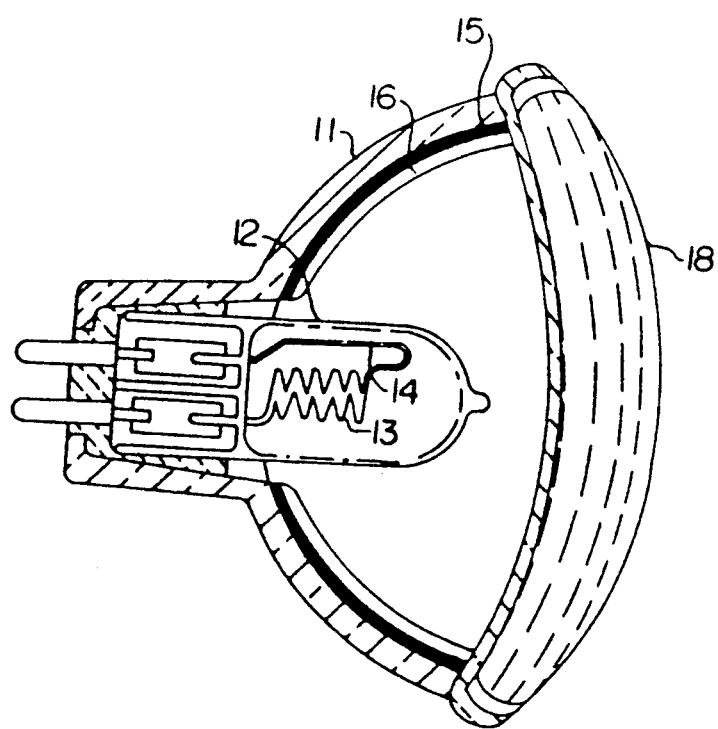
FIG. 3 is a cross-sectional view of an additional example of a lamp of the invention.

While the lamp examples illustrated in FIGS. 1 and 2 are open faced (i.e., with no lens), the light mirror of the invention may also be used in a lamp having a lens mounted over the face of the lamp. An example of a lamp, in cross-section, having a lens mounted to the rim of the reflector to form a closed lamp, is shown in FIG. 3. The lamp illustrated in FIG. 3 has a lens 18 bonded to reflector 11. Such bonding may be accomplished by an adhesive, cement, or other appropriate bonding material. The lamp includes a light source 12 mounted within the reflector, and has a metal coating 15 disposed on the reflecting surface of the reflector 11 and a dichroic coating 16 disposed on the metal coating 15.

The following examples are provided to enable those skilled in the art to more clearly understand and practice the present invention. These examples should not be considered as a limitation upon the scope of the invention, but merely as being illustrative and representative thereof.

EXAMPLE 1

Before application of the metal coating, transparent pyrex glass parabolic reflector substrates are preliminarily cleaned in a detergent with ultra sonic vibrations. Afterwards, the substrates are rinsed in deionized water and dried. Following the drying step, the substrates are further cleaned by a glow discharge.

The clean transparent parabolic substrates are then placed in a vacuum chamber. The vacuum chamber is pumped to high vacuum. Oxygen is let into the chamber, while an electrode is charged with 3000 volts. The oxygen pressure is raised until the discharge current is about 100 mA. After a few minutes, the chamber is pumped again to high vacuum.

The aluminum coating is first evaporated in this high vacuum. Due to the parabolic shape of the substrate, most of the aluminum is evaporated onto the center of the reflector. This is advantageous for blocking the heat transmitted to the back of the reflector.

By varying the thickness of the aluminum coating from 0 to 200 nm, the infra-red reflection from the reflector-light source combination can be increased from about 20% to about 90%.

The exact structure of the dichroic coating is dependent upon which wavelengths of light are to be reflected and which are to be transmitted through the dichroic coating. The determination of the dichroic coating structure is easily made by one having ordinary skill in the dichroic art.

The desired number of alternating layers of high and low refractive index materials are deposited in the chosen sequence and at the desired thickness by vacuum deposition techniques well known in the art. As is well understood in the dichroic art, the thickness of each of the layers of the dichroic coating should be equal over the entire substrate surface. Obtaining such equal thickness is preferably accomplished by using a stray-gas atmosphere which involves including an inert gas in the coating chamber to control the pressure in the chamber during the coating process. Such pressure control technique is well known to those in the coating art. As is also common in the art, during evaporation, the thickness of the layers is continuously monitored by a quartz crystal.

For a 50 watt, 12 volt tungsten halogen light-source, an aluminum layer of 12 nm has proven to decrease fixture temperatures by approximately 30° C.

THE DICHROIC COATING

Specification for a Preferred Dichroic Coating For Use in General Lighting Applications

A. Optical Requirements

A preferred dichroic coating has the following transmission characteristics:

less than 5% transmission in the range from 430 to 700 nm the 50% transmission point must be between 760-860 nm the average transmission between 900-2500 nm must be greater than 80%.

B. Adhesion of the Coating

The preferred dichroic coating meets the following criteria:
a) the coating does not peel off after 10 minutes in boiling water; and
b) the coating is not removed by a tape test (pressing a piece of adhesive tape against the coated surface and removing it with a snap).

Figure 4:
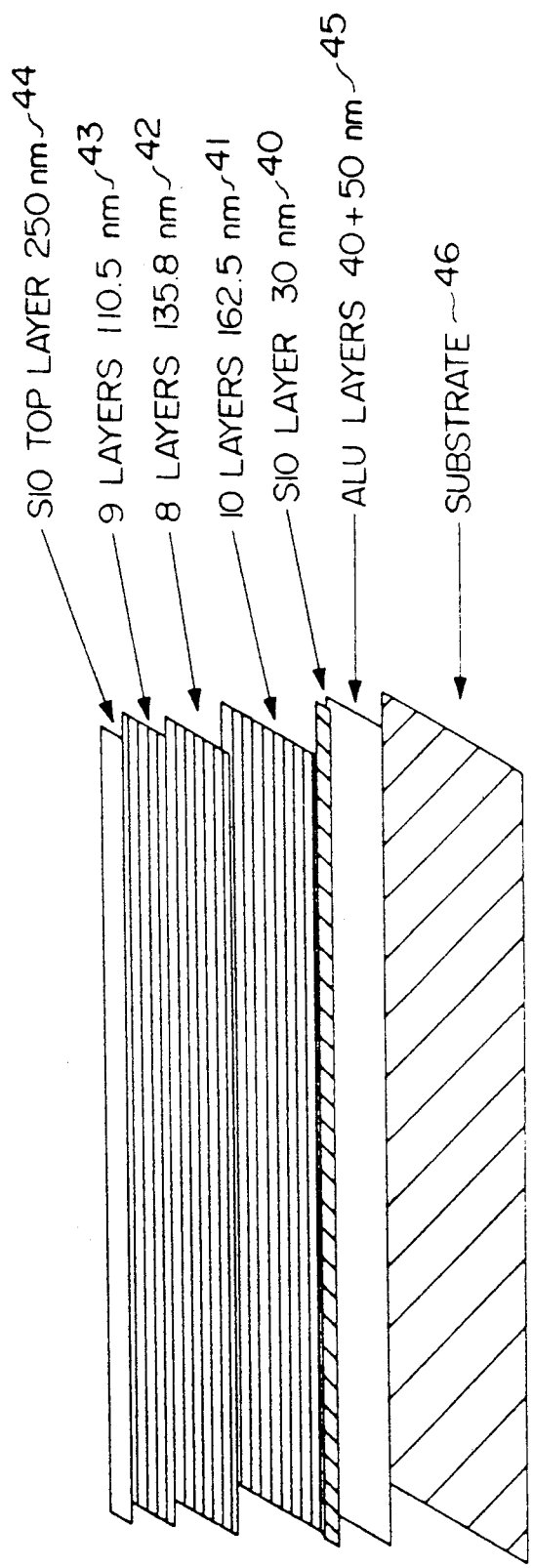
FIG. 4 illustrates a side view of an example of a most preferred embodiment of the light mirror of the invention.

Description of a Most Preferred Coating For Use in General Lighting Applications An example of a most preferred coating includes 29 layers of ZnS and SiO as indicated by the asterisk below and is illustrated in FIG. 4. These layers include three stacks as indicated by the asterisk below as shown in the following formula:

$$S0 + 5*(Z1+S1) + 4*(Z1+S1) + (Z3+S3) + Z3 + ST$$

The S0 layer 40 is a very thin SiO layer (30 nm). It is used to improve the adherence of the coating to the glass substrate 46.

The Z layers are ZnS layers;

The S layers are SiO layers;

The Z1 and S1 layers each have an optical thickness of 162.5 nm. The Z1-S1 stack 41 includes ten (10) alternating layers of ZnS and SiO.

The Z2 and S2 layers each have an optical thickness of 135.8 nm. The Z2-S2 stack 42 includes eight (8) alternating layers of ZnS and SiO.

The Z3 and S3 layers each have an optical thickness of 110.5 nm. The Z3-S3 stack 43 includes nine (9) alternating layers of ZnS and SiO.

The ST (SiO Top Layer) layer 44 is a very thick SiO layer (250 nm). It is used as a protective layer.

After the above-described coating is formed on the substrate, the coated substrate is tempered in a furnace to oxidize the SiO layers to $SiO_2$. This tempering step most preferably includes heating the coated substrate in a furnace at about 450° C. for one hour.

Thus, in the finished product, the dichroic coating includes alternating layers of ZnS and $SiO_2$.

Figure 5:
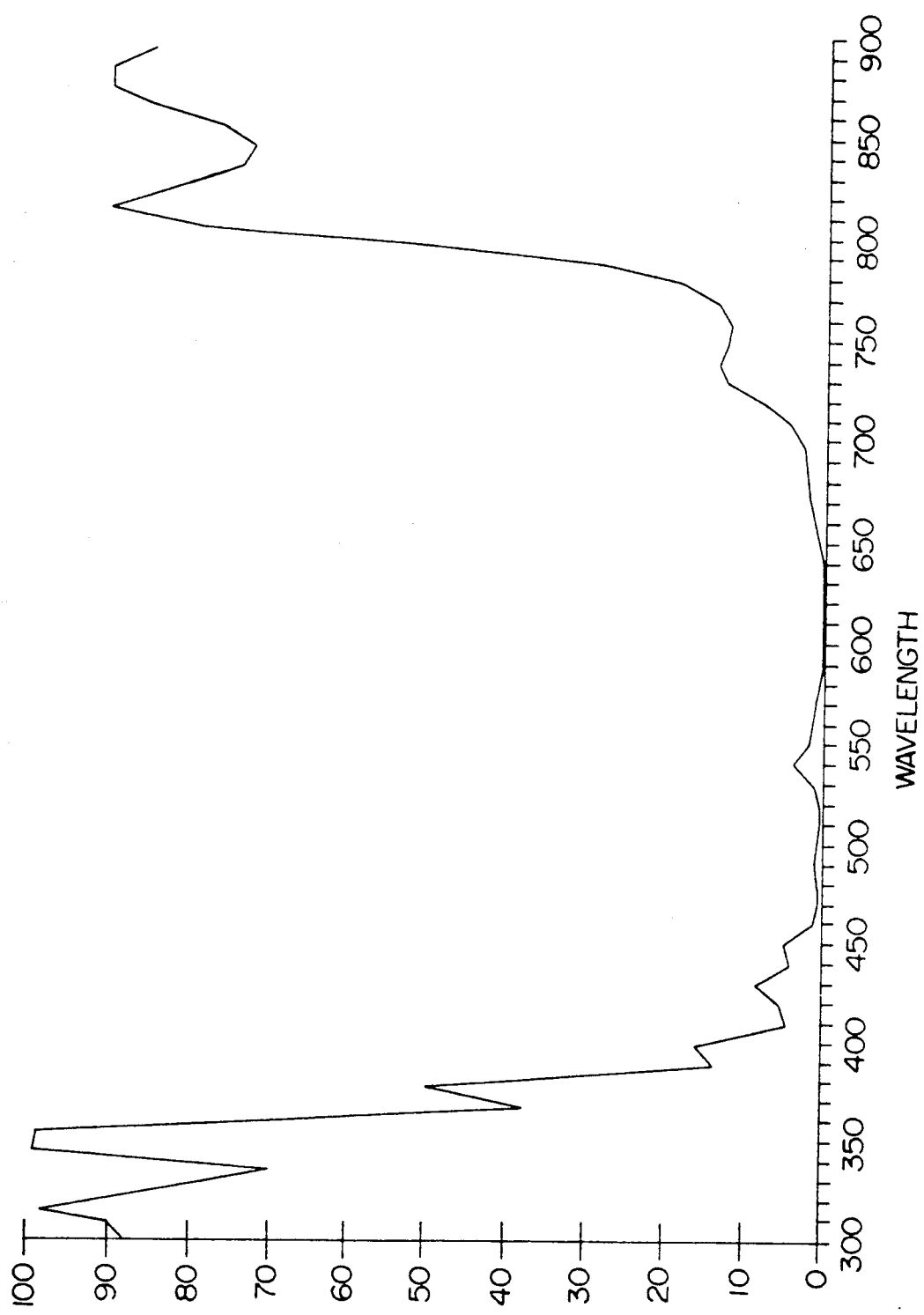
FIG. 5 illustrates a transmission curve of a dichroic coating on a substrate.

The transmission curve for this coating is shown in FIG. 5.

THE METAL COATING

Tests with Different Coatings To Increase Heat-reflection

Different metals were tested in combination with the above-described example of a most preferred dichroic coating on a parabolic shaped transparent glass reflector substrate. Each of the different metal coatings was tested by assembling the respective reflectors into a lamp and measuring the temperature of a standard fixture.

Following Examples 2-4 describe the performance of a reflector in accordance with the present invention wherein the thickness of the metal coating is varied over the range from 0 to 200 nm, for chromium, aluminum, and silver, respectively. Example 5 describes the results for a reflector on which silicon was used as the metal coating material.

EXAMPLE 2

In this example, tests were conducted for a reflector having a metal layer comprising chromium and the above-described 29 layer dichroic coating. The temperature of the fixture was measured for reflectors on which the chromium coating thickness was 0 nm, 100 nm, 150 nm, and 200 nm, and the temperature data is listed below.

| Thickness | Temperature |
| --- | --- |
| 0 nm | 159–166° C. |
| 100 nm | 165° C. |
| 150 nm | 166° C. |
| 200 nm | 166° C. |

The temperatures measured indicate that the temperature of the fixture is not affected by the chromium layer thickness. This is probably due to the high absorption of chromium in the infrared region. This causes the coating to heat up instead of reflecting the heat to the front of the lamp.

EXAMPLE 3

In this example, tests were conducted for a reflector having a metal layer comprising aluminum and the above-described 29 layer dichroic coating. The temperature of the fixture was measured for reflectors on which the aluminum coating thickness was 25 nm, 50 nm, 70 nm, and 90 nm, and the temperature data is listed below.

| Thickness | Temperature |
|---|---|
| 25 nm | 165° C. |
| 50 nm | 152° C. |
| 70 nm | 146° C. |
| 90 nm | 131° C. |

The coating has a silvery-white appearance when the aluminum layer thickness exceeds 70 nm. Below that value the coating shows a strong brown discoloration. Thus, for lighting applications in which the aesthetic appearance of the coating is important, the aluminum coating is preferably greater than or equal to about 70 nm.

EXAMPLE 4

In this example, tests were conducted for a reflector having a metal layer comprising silver and the above-described 29 layer dichroic coating. The temperature of the fixture was measured for reflectors on which the silver coating thickness was 100 nm and 250 nm, and the temperature data is listed below.

| Thickness | Temperature |
|---|---|
| 100 nm | 160° C. |
| 250 nm | 149° C. |

The coating looks silvery-white after coating but discolors very quickly during the life test of the lamps.

EXAMPLE 5

An attempt was made to test a reflector on which silicon was used as the metal coating, with the above-described 29 layer dichroic coating.

However, because in each instance the coatings peeled after initial tape test, no tests were completed.

Further Tests With a Metal Film Comprising Aluminum

This section describes additional tests conducted on the light mirror of the invention wherein the metal layer comprises aluminum.

Of the metals tested, aluminum is the most economically desirable, and a coating thickness of about 100 nm, as measured by the quartz crystal in the center of the substrate holder in the coating apparatus, is preferred for an aluminum metal coating.

(An aluminum layer having a thickness of 50 nm as measured by the quartz crystal measuring device in the coating apparatus has an estimated actual thickness of 30 nm.)

To apply the aluminum metal coating to the reflector-shaped transparent substrate, two different methods of evaporating aluminum were initially used, namely:

Method 1—evaporation in high vacuum ($10^{-5}$ mbar)
Method 2—evaporation in an inert stray gas ($10^{-3}$ mbar Argon)

Method 1 provides a poor thickness distribution over the reflector surface with the layer being thick in the center of the reflector and much thinner at the rim. This causes the reflectors to discolor at the rim.

Method 2 produces aluminum layers with a very poor adhesion to glass. The coating on reflectors coated by this method peeled after boiling water test.

The problems associated with methods 1 and 2 were solved by evaporating the aluminum coating as two separate layers of aluminum. See FIG. 4. A first aluminum 1 layer, having a thickness of about 50 nm (as measured by the quartz crystal), is evaporated in high vacuum to get a good adhesion to the glass substrate 16; and a second aluminum layer having a thickness of about 50 nm (as measured by the quartz crystal), is evaporated in $9 \times 10^{-4}$ mbar Argon gas to correct the layer thickness at the rim of the reflector. (See the aluminum coating 15, as illustrated in FIG. 1). On top of these two layers, the above-described 29 layer dichroic coating is evaporated in $9 \times 10^{-4}$ mbar of oxygen. (See FIG. 4).

Figure 6:
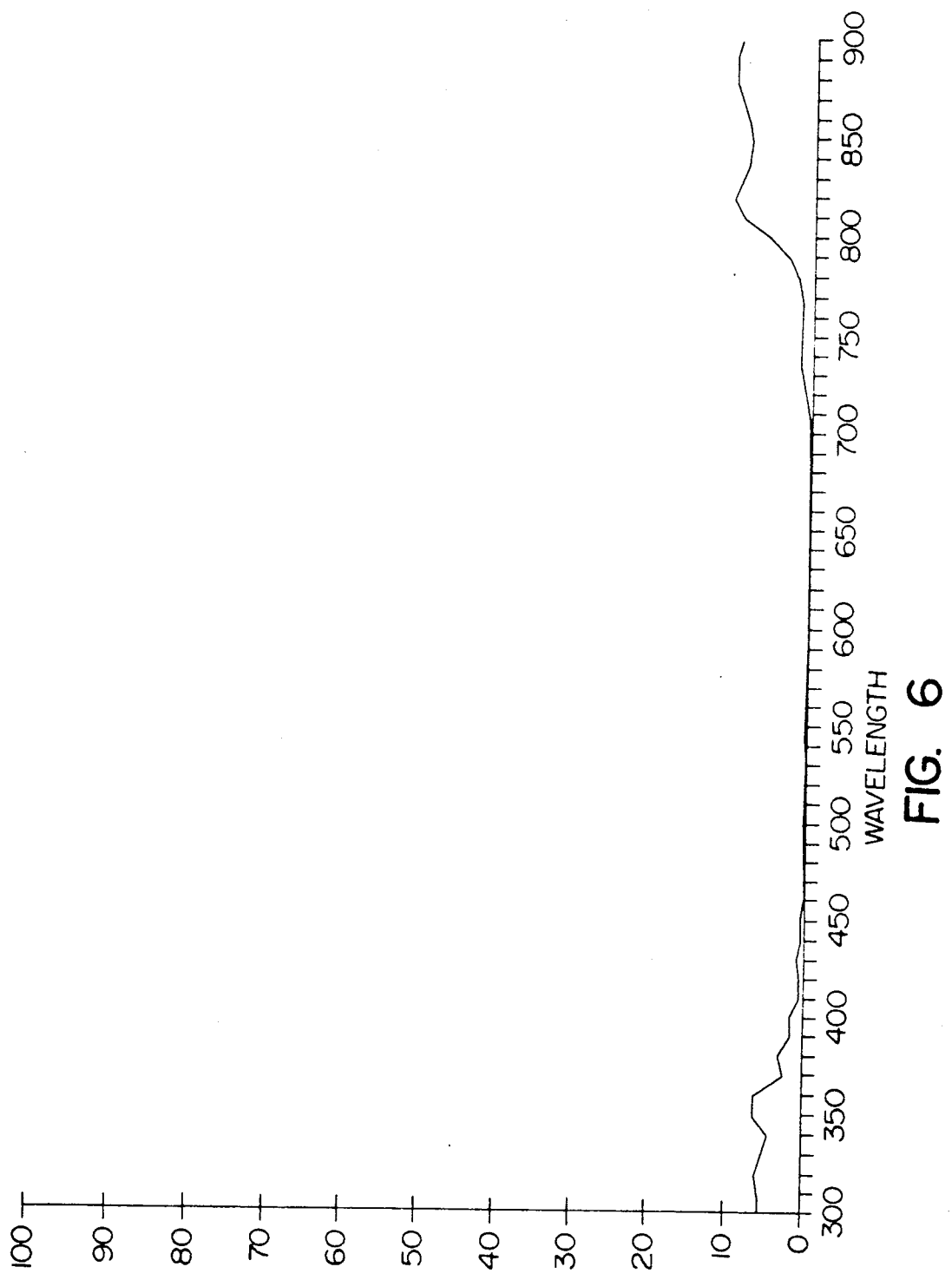
FIG. 6 illustrates a transmission curve of a light mirror having the coating shown in FIG. 4.

A transmission curve for a light mirror having the structure shown in FIG. 5, using the above-described 29 layer dichroic coating, is shown in FIG. 6.

Tests Results

A. Temperature Measurements

A test was run to compare the temperature of a fixture including a 50 watt tungsten halogen lamp with a reflector having only the above-described 29 layer dichroic coating on its reflecting surface (referred to hereinafter as the "Standard coating") with that of a fixture including a 50 watt tungsten halogen lamp with a reflector having a 90 nm aluminum coating with the above-described 29 layer dichroic coating superposed thereon (referred to hereinafter as the "Revised Coating"). (The aluminum coating was deposited as a two-layer coating as described previously).

The temperature of the fixture including the glass reflector with only the above-described 29 layer dichroic coating was measured to be 159°-166° C.

The temperature of the fixture including the glass reflector with the 90 nm aluminum coating and the above-described 29 layer dichroic coating was measured to be 132°-146° C.

B. Adhesion Test

Five batches were evaporated. For each batch, five reflectors were tested. After the boiling water test no discoloration or peeling was noticed. After a supplementary tape test, some reflectors peeled a very thin section in the neck of the reflector (same as the standard reflectors at that time).

C. Life Test Results

The specification for a 50 watt Sylvania Tru-Aim Professional lamp is 3000 hrs. (The Tru-Aim Professional lamp is a reflector type lamp having a dichroic coating on the surface of a parabolic glass reflector and employing a tungsten halogen light source.)

The average life calculated for 180 reflector type lamps of the same wattage and having the above-described "Revised" coating thereon was 3387 hrs.

D. Candela Maintenance During Life

Figure 7:
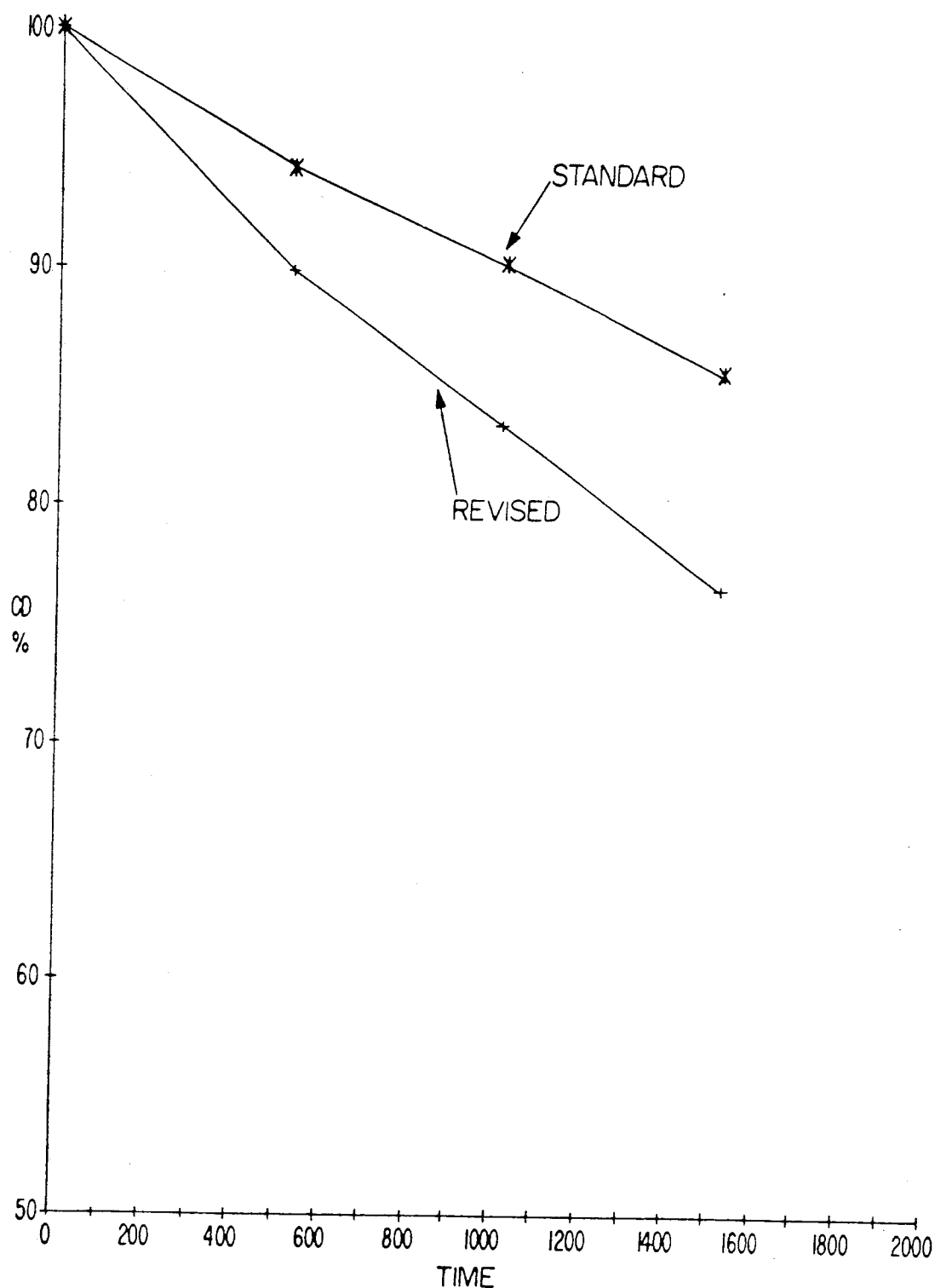
FIG. 7 graphically compares the Cd maintenance of a lamp having a dichroic coated reflector and that of a lamp including a reflector made in accordance with the invention.

The Candela maintenance for 50 watt tungsten halogen reflector type lamps employing a Standard Coating and lamps employing a Revised Coating is graphically illustrated in FIG. 7.

Lamps employing the Standard Coating had a Cd maintenance of 87.1% after 1000 hrs.

Lamps employing the Revised Coating had a Cd maintenance of 81.9% after 1500 hrs.

E. Color Temperature Maintenance During Life

Figure 8:
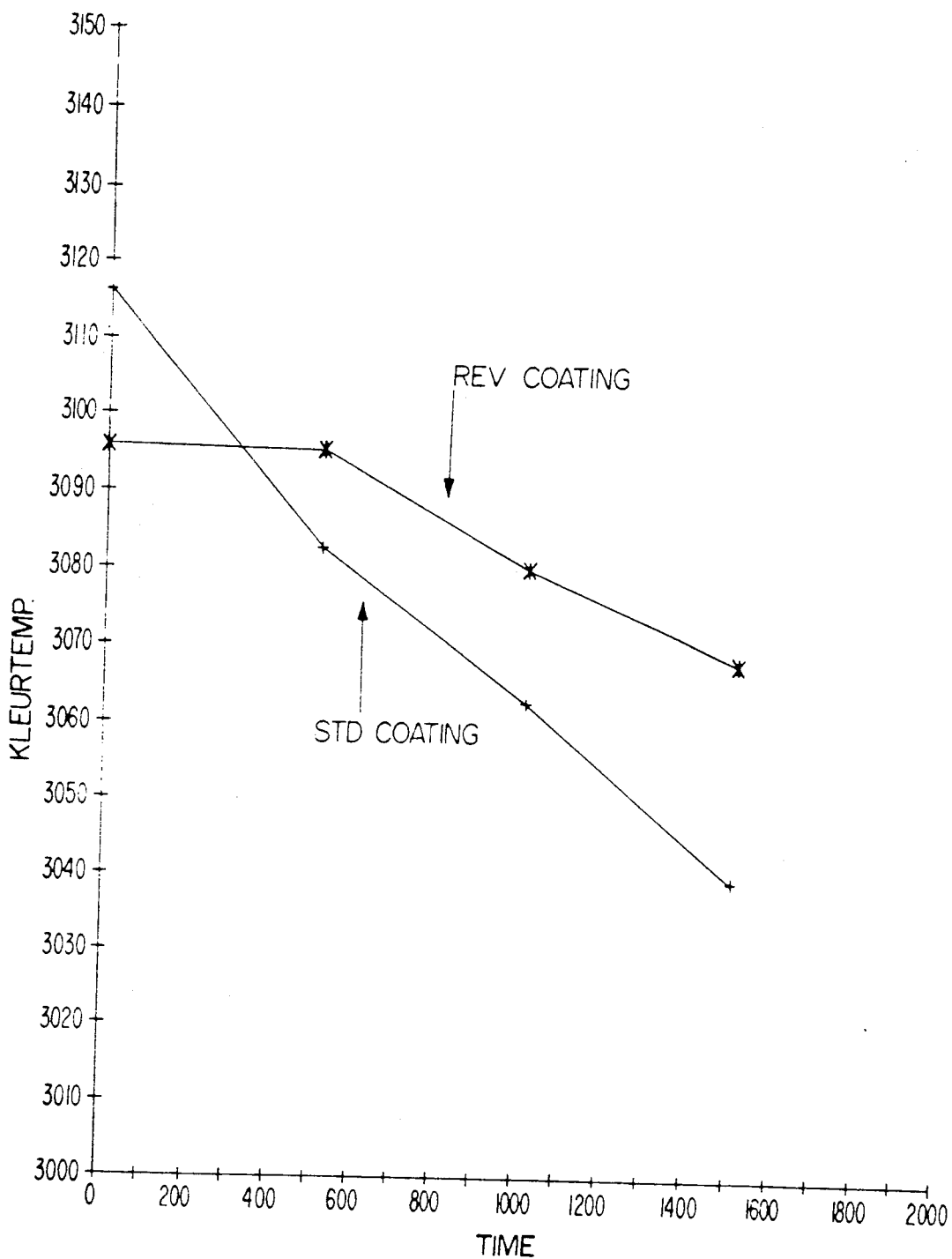
FIG. 8 graphically compares the color temperature over a time of a lamp having a dichroic coated reflector and that of a lamp including a reflector made in accordance with the invention.

The color temperature maintenance for 50 watt tungsten halogen reflector type lamps employing a Standard Coating and lamps employing a Revised Coating is graphically illustrated in FIG. 8.

After 1500 hours of operation, lamps employing the Standard Coating had a color temperature difference of 77K (i.e., 3116K-3039K).

After 1500 hours of operation, lamps employing the Revised Coating had a color temperature difference of 17K (i.e., 3095K-3068K).

While there have been shown and described what at present are considered to be the preferred embodiments of the invention, it will be apparent to those skilled in the art that various changes can be made herein without departing from the scope of the invention as defined by the appended claims.

What is claimed is:

1. A lamp comprising:
a light mirror having a reflector-shaped light pervious substrate partially enclosing an interior and having a reflecting surface, a reflective metal coating disposed on the reflecting surface of the reflector-shaped substrate, and a dichroic coating made of twenty nine alternating layers of $SiO_2$ and ZnS disposed on the metal coating; and
a light source capsule mounted within the interior of the reflector wherein the light mirror transmits less than 0.5% of light having wavelengths from about 430 nm to about 700 nm and reflects at least about 80% of light having wavelengths from about 800 nm to about 2500 nm.

2. A lamp in accordance with claim 1 wherein the metal coating comprises a metal having a reflection coefficient greater than or equal to about 0.8.

3. A lamp in accordance with claim 1 wherein the metal coating has a thickness less than or equal to 200 nm.

4. A lamp in accordance with claim 1 wherein the metal coating comprises aluminum.

5. A lamp in accordance with claim 1 wherein the metal coating comprises silver.

6. A lamp in accordance with claim 1 wherein the metal coating comprises gold.

7. A lamp in accordance with claim 1 wherein the metal coating comprises rhodium.

8. A lamp in accordance with claim 1 wherein each of said alternating layers of silicon oxide and zinc sulfide, has a respective optical thickness, wherein:
layer 1 comprises $SiO_2$ with an optical thickness of 30 nm;
layer 2 comprises ZnS with an optical thickness of 162.5 nm;
layer 3 comprises $SiO_2$ with an optical thickness of 162.5 nm;
layer 4 comprises ZnS with an optical thickness of 162.5 nm;
layer 5 comprises $SiO_2$ with an optical thickness of 162.5 nm;
layer 6 comprises ZnS with an optical thickness of 162.5 nm;
layer 7 comprises $SiO_2$ with an optical thickness of 162.5 nm;
layer 8 comprises ZnS with an optical thickness of 162.5 nm;
layer 9 comprises $SiO_2$ with an optical thickness of 162.5 nm;
layer 10 comprises ZnS with an optical thickness of 162.5 nm;
layer 11 comprises $SiO_2$ with an optical thickness of 162.5 nm;
layer 12 comprises ZnS with an optical thickness of 135.8 nm;
layer 13 comprises $SiO_2$ with an optical thickness of 135.8 nm;
layer 14 comprises ZnS with an optical thickness of 135.8 nm;
layer 15 comprises $SiO_2$ with an optical thickness of 135.8 nm;
layer 16 comprises ZnS with an optical thickness of 135.8 nm;
layer 17 comprises $SiO_2$ with an optical thickness of 135.8 nm;
layer 18 comprises ZnS with an optical thickness of 135.8 nm;
layer 19 comprises $SiO_2$ with an optical thickness of 135.8 nm;
layer 20 comprises ZnS with an optical thickness of 110.5 nm;
layer 21 comprises $SiO_2$ with an optical thickness of 110.5 nm;
layer 22 comprises ZnS with an optical thickness of 110.5 nm;
layer 23 comprises $SiO_2$ with an optical thickness of 110.5 nm;
layer 24 comprises ZnS with an optical thickness of 110.5 nm;
layer 25 comprises $SiO_2$ with an optical thickness of 110.5 nm;
layer 26 comprises ZnS with an optical thickness of 110.5 nm;
layer 27 comprises $SiO_2$ with an optical thickness of 110.5 nm;
layer 28 comprises ZnS with an optical thickness of 110.5 nm;
layer 29 comprises $SiO_2$ with an optical thickness of 110.5 nm, wherein layer 1 of $SiO_2$ being disposed on the metal coating.

9. A lamp in accordance with claim 1 wherein the substrate comprises glass.

10. A lamp in accordance with claim 1 wherein the reflector-shaped substrate has a rim and a lens mounted in the rim of the reflector-shaped substrate so as to form a closed lamp.

11. A lamp in accordance with claim 8 wherein the metal coating comprises aluminum.

12. A lamp in accordance with claim 11 wherein the metal coating has a thickness from about 12 nm to about 100 nm.

13. A lamp in accordance with claim 12 wherein the metal coating has an optical thickness of about 100 nm.

14. A lamp in accordance with claim 13 wherein the metal coating comprises a first metal film having an optical thickness of about 50 nm and a second metal film having an optical thickness of about 50 nm.

15. A lamp in accordance with claim 14 wherein the light source is a tungsten halogen light source.

16. A lamp in accordance with claim 14 wherein the light source is an incandescent light source.

17. A lamp in accordance with claim 14 wherein the light source is a metal halide light source.

* * * * *